United States Patent
Bagge et al.

(10) Patent No.: US 7,412,324 B1
(45) Date of Patent: Aug. 12, 2008

(54) FLIGHT MANAGEMENT SYSTEM WITH PRECISION MERGING

(75) Inventors: Charles J. Bagge, Cedar Rapids, IA (US); Donald J. Whalen, Cedar Rapids, IA (US); Bechara J. Mallouk, Mukilteo, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/236,992

(22) Filed: Sep. 28, 2005

(51) Int. Cl.
*G06F 19/00* (2006.01)
*G06G 7/76* (2006.01)

(52) U.S. Cl. .............. 701/120; 701/121; 701/122; 340/948; 340/951; 342/36

(58) Field of Classification Search .............. 701/120, 701/121, 122; 342/36; 340/948, 951, 974
See application file for complete search history.

(56) References Cited

U.S. PATENT DOCUMENTS

| | | | |
|---|---|---|---|
| 5,554,990 A * | 9/1996 | McKinney | 342/36 |
| 5,570,097 A * | 10/1996 | Aguado | 342/357.06 |
| 5,714,948 A * | 2/1998 | Farmakis et al. | 340/961 |
| 6,393,358 B1 * | 5/2002 | Erzberger et al. | 701/120 |
| 6,789,011 B2 * | 9/2004 | Baiada et al. | 701/120 |
| 6,847,866 B2 * | 1/2005 | Gaier | 701/4 |
| 2004/0044446 A1 * | 3/2004 | Staggs | 701/16 |
| 2005/0114023 A1 * | 5/2005 | Williamson et al. | 701/214 |
| 2005/0182531 A1 * | 8/2005 | Ryan et al. | 701/16 |
| 2006/0032978 A1 * | 2/2006 | Matos et al. | 244/118.5 |
| 2006/0074558 A1 * | 4/2006 | Williamson et al. | 701/213 |
| 2006/0200279 A1 * | 9/2006 | Ainsworth et al. | 701/16 |

* cited by examiner

*Primary Examiner*—Khoi H. Tran
*Assistant Examiner*—Jorge O Peche
(74) *Attorney, Agent, or Firm*—Nathan O. Jensen; Kyle Eppele

(57) ABSTRACT

The present invention is a flight management system with precision merging that may determine a rejoin turn location based upon a heading to allow proper spacing between an aircraft and an identified target aircraft. The flight management system may monitor for deviation from assigned airspace, winds, turn radius and desired airport speed profile for the approach to further refine a turn-back location. Advantageously, a delay in landing of the target aircraft may not affect the landing approach of other aircraft. This may result in more accurate spacing between aircraft which are closer to the allowed separation minima and may provide an increase in capacity especially in high-density areas.

11 Claims, 8 Drawing Sheets

$d1 = r / \tan(a)$ $a = |(180 - |(\Delta \Psi)|)|$ $d2 = 2n\mu$ $r = \dfrac{v^2}{g * \tan(\phi)}$ $\mu = 90 - \dfrac{a}{2}$ $n = \dfrac{2\pi r}{360}$

| | | |
|---|---|---|
| $\phi$ | | Bank Angle |
| g | | gravity in ft/s =32.1740 |
| $\Delta\psi$ | | Heading difference |
| d1 | | Intercept to turn distance |
| d2 | | Intercept to Intercept curved distance |
| n | | Distance per degree |

FLIGHT MANAGEMENT SYSTEM WITH PRECISION MERGING

FIELD OF THE INVENTION

The present invention relates generally to aircraft control; and more particularly to a system and method of precision merging of aircraft while maintaining safe separation among aircraft.

BACKGROUND OF THE INVENTION

The use of aircraft is vital for transporting individuals and shipping products. During peak travel times, over five thousand airplanes may be in the sky each hour in the United States. Air traffic controllers direct each aircraft in the air to ensure safe operation of each aircraft and to maintain a safe distance between each aircraft.

Airspace around airports is especially congested. This problem is exacerbated at large airports where many aircraft are departing and landing in short intervals of time. An air traffic controller may direct a pilot to adjust an aircraft's heading, speed and altitude to begin the runway approach. Air traffic controllers base their directions to each aircraft to establish an efficient approach procedure for each aircraft. On the final leg of a runway approach, an air traffic controller must ensure aircraft separation. For example, it may be desired that each aircraft has at least ninety-one (91) seconds of time separation between landings. As a result, the air traffic controller must add extra buffers to allow margins for pilots to ensure a safe landing approach for each aircraft. However, a delay of a first aircraft to land may cause a daisy-chain effect which causes a delay in other aircraft waiting to land. Consequently, an efficient method and system for landing aircraft while maintaining safe separation among aircraft is necessary.

SUMMARY OF THE INVENTION

Accordingly, the present invention is directed to an efficient method and system for landing aircraft while maintaining safe separation among aircraft. In one embodiment of the invention, a flight management system of the present invention may determine a location for a rejoin turn to a waypoint wherein the rejoin turn location may create desired spacing between the aircraft and an identified target aircraft. The flight management system may employ an automatic dependent surveillance broadcast (ADSB) which may indicate the presence, heading and speed of the target aircraft. The flight management system may also monitor for deviation from assigned airspace, winds, turn radius and desired airport speed profile for the approach to further refine a rejoin turn location. Advantageously, more accurate spacing between aircraft which are closer to the allowed separation minima may be achieved along with an increase in capacity especially in high-density areas.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Referring generally to FIGS. 1-8, a method and system for efficient landing of aircraft while maintaining safe separation among aircraft is shown. When multiple aircraft are in airspace in proximity to an airport, each aircraft are directed individually through multiple instructions and landing procedures. Conventionally, this has been under the control of air traffic controllers. Because of the need to maintain a safe separation between aircraft, buffers are included within the directions provided by the air traffic controller. This results in inefficient landing of aircraft.

A flight management system of the present invention may be proceeding on a heading and then may automatically direct the flight crew to an appropriate landing procedure while maintaining minimal spacing between the aircraft and a target aircraft. This replaces the requirement of an air traffic controller to provide multiple instructions for each aircraft and provides increased controller availability by re-organization and streamlining of tasks. Additionally, more accurate spacing between aircraft, closer to the allowed minimum spacing, may be achieved which may result in an increase in landing capacity.

Figure 1:
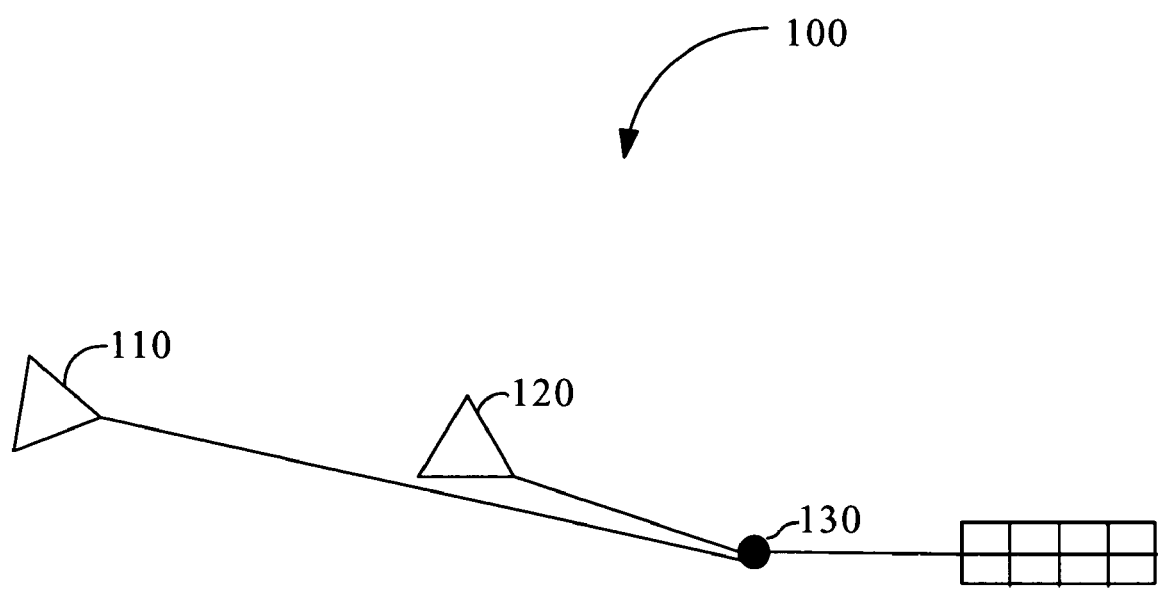
FIG. 1 depicts an exemplary remain behind procedure for aircraft in accordance with an embodiment of the present invention.

Referring to FIG. 1, an exemplary remain behind procedure 100 in accordance with the present invention is shown. In some cases, proper spacing may be achieved between an aircraft 110 and an identified target aircraft 120 through a minimal speed change of the aircraft 110. It is contemplated that target aircraft may be identified along with the target aircraft's heading, speed and distance to a waypoint 130. Based upon a target aircraft's heading, speed and distance to a waypoint 130, a time of arrival at the waypoint 130 may be calculated for the target aircraft. In order to achieve desired spacing, aircraft 110 may arrive at a waypoint 130 after a desired delay. Through an adjustment of speed of aircraft 110, aircraft 110 may arrive at the waypoint 130 after the desired delay.

It is contemplated that the minimal speed change of the aircraft 110 may result in a speed profile which is desirable for the beginning of the landing approach. For example, through a reduction of airspeed, aircraft 110 may continue on a current heading to the waypoint 130 for beginning of the landing approach whereby the reduced airspeed is within a desirable range for beginning the landing approach. A heading may refer to a compass direction in which an aircraft moves. For example, a ninety (90) degree heading may be a due East direction of flight.

A flight management system of the present invention may be capable of determining the proper airspeed to provide proper spacing between aircraft 110 and target aircraft 120. Based upon the heading, distance to waypoint 130 and speed of the target aircraft 120, a predicted time of arrival at the waypoint may be determined by the flight management system. Flight management system may determine a proper speed whereby aircraft 110 reaches the waypoint 130 at a specified time period after target aircraft has passed the waypoint 130. Flight management system may also ensure that the proper speed for ensuring the proper spacing is within an acceptable speed profile for the landing approach of aircraft 110.

Figure 2:
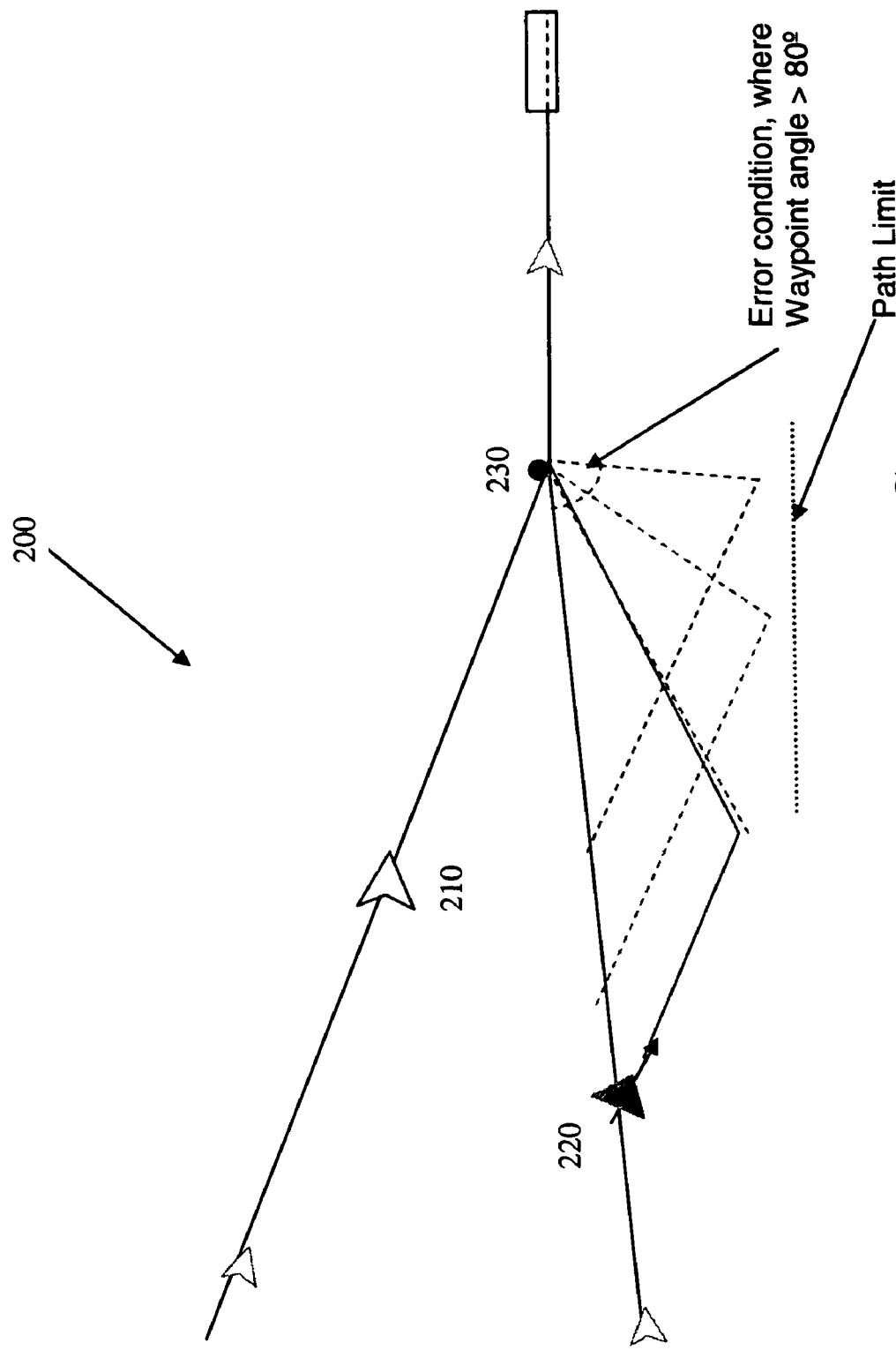
FIG. 2 depicts an exemplary merging procedure for aircraft in accordance with an embodiment of the present invention.

Referring to FIG. 2, an exemplary merging procedure 200 for aircraft in accordance with an embodiment of the present invention is shown. Since a desired speed profile for the landing approach is required, in some cases spacing between an aircraft 210 and a target aircraft 220 may not be achieved through a reduction of speed of aircraft 210. A merging procedure 200 may be employed which utilizes a heading change and a dogleg procedure to provide desired spacing between aircraft 210 and target aircraft 220 to maintain an ideal speed profile for the landing approach.

Merging procedure 200 may begin upon receipt of a heading. In an embodiment of the invention, receipt of a heading may be received from an air traffic controller. In an alternative embodiment, heading may be dictated by a landing procedure followed by aircraft for a particular runway. For example, a heading may be a right turn such as "turn 20 degrees right" received from the air traffic controller. The flight management system of the present invention may determine the time or location in which to initiate the second turn or "rejoin turn" to direct the aircraft 210 to the waypoint 230 wherein the desired amount of spacing is achieved. For example, ninety (90) seconds of spacing may be required at the waypoint 230. Flight management system of the present invention may calculate and present to the pilot the correct time or location for initiating the rejoin turn to the waypoint 230. The flight management system may be capable of identifying target aircraft 220 and based upon the heading, speed and distance to the waypoint 230 of the target aircraft 220, a predicted time of arrival at the waypoint 230 may be determined. Flight management system may determine a location for a rejoin turn to ensure desired spacing after target aircraft 220 reaches waypoint 230. Determination of the location may be based upon the current heading and speed of the aircraft and the predicted distance away from the waypoint after the rejoin turn to arrive at the waypoint after the target aircraft according to a desired delay. Use of the flight management system of the present invention may provide additional air traffic controller availability as the only instruction provided by the air traffic controller may an initial heading instruction. Upon beginning the rejoin turn, it is contemplated that flight crew may alert air traffic control.

The determination of a location may further be based upon a turn radius of an aircraft. The location may refer to a distance to proceed upon a heading and may also refer to a time measurement to proceed upon a heading. It is further contemplated that flight management system may ensure that a heading change which will be performed by aircraft 210 at waypoint may be an acceptable range. For example, if the change may be greater than an eighty (80) degree heading change, an error condition may be reported. Additionally, flight management system may ensure that the location for the rejoin turn is not outside a path limit. This may prevent the aircraft from entering protected airspace. Flight management system may further indicate if aircraft 210 is proceeding on an unacceptable flight path angle. Additionally, the location for the rejoin turn may be recalculated as an aircraft is proceeding to the location of the rejoin turn. This may allow for compensation due to wind changes, deviation of path and the like for both aircraft 210 and target aircraft 220. It is further contemplated that a fail-safe hold maneuver may be automatically provided if an emergency condition exists, including weather, aircraft deviation from path and the like.

As aircraft is proceeding on a heading, a location for a rejoin turn may be determined. The location may be based upon a turn radius of the aircraft and based upon the heading, speed and distance to the waypoint of aircraft 210 to allow the aircraft 210 to pass the waypoint 230 after target aircraft according to a desired delay. The determination may be based upon maintaining a constant speed; however, the location may be adjusted if a speed of the aircraft changes. For example, a speed of the aircraft may change based upon a tailwind. Deviations from the flight path, for example, 0.5 nautical mile deviations, may also be added or subtracted to change the time at which the aircraft 210 arrives at waypoint 230.

Figure 3:
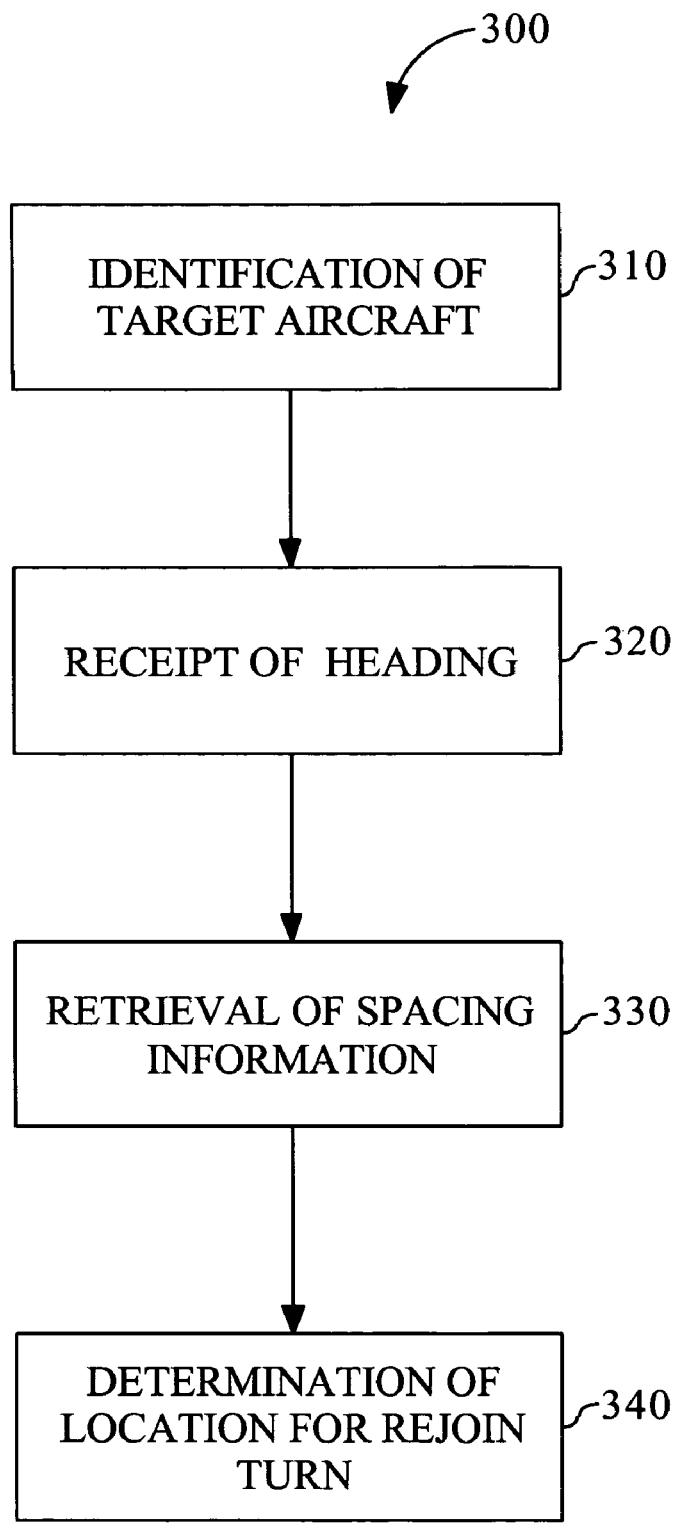
FIG. 3 depicts a process of merging in accordance with an embodiment of the present invention.

Referring to FIG. 3, a process 300 of merging in accordance with an embodiment of the present invention is shown. Process 300 may be executed to achieve proper spacing between an aircraft and a target aircraft. Process 300 may begin upon the identification of a target aircraft 310. In order to achieve proper spacing, a heading may be received 320. In one embodiment of the invention, heading may be received from an air traffic controller. The desired spacing information for a particular airport or runway at a particular airport may be retrieved 330. It is contemplated that desired spacing information for an airport or a particular runway of an airport may be maintained in memory of a flight management system of the present invention, such as within a database. It is further contemplated that a desired speed at the waypoint may be maintained in memory of the flight management system to ensure the aircraft is traveling at an appropriate speed. Alternately, desired spacing information and a speed profile may be received from air traffic control. Spacing information may refer to a period of time, such as ninety (90) seconds or may refer to a distance measurement in an alternative embodiment of the invention. A location to achieve the desired spacing to begin a rejoin turn is determined 340. The determination of the location may be based upon the current heading and speed of the aircraft and the predicted distance away from the waypoint after the rejoin turn to arrive at the waypoint after the target aircraft according to a desired delay. It is contemplated that the location may be a distance measurement proceeding on the heading, such as 10 nautical miles or alternatively may be a time measurement, such as 30 seconds and the like.

Figure 4:
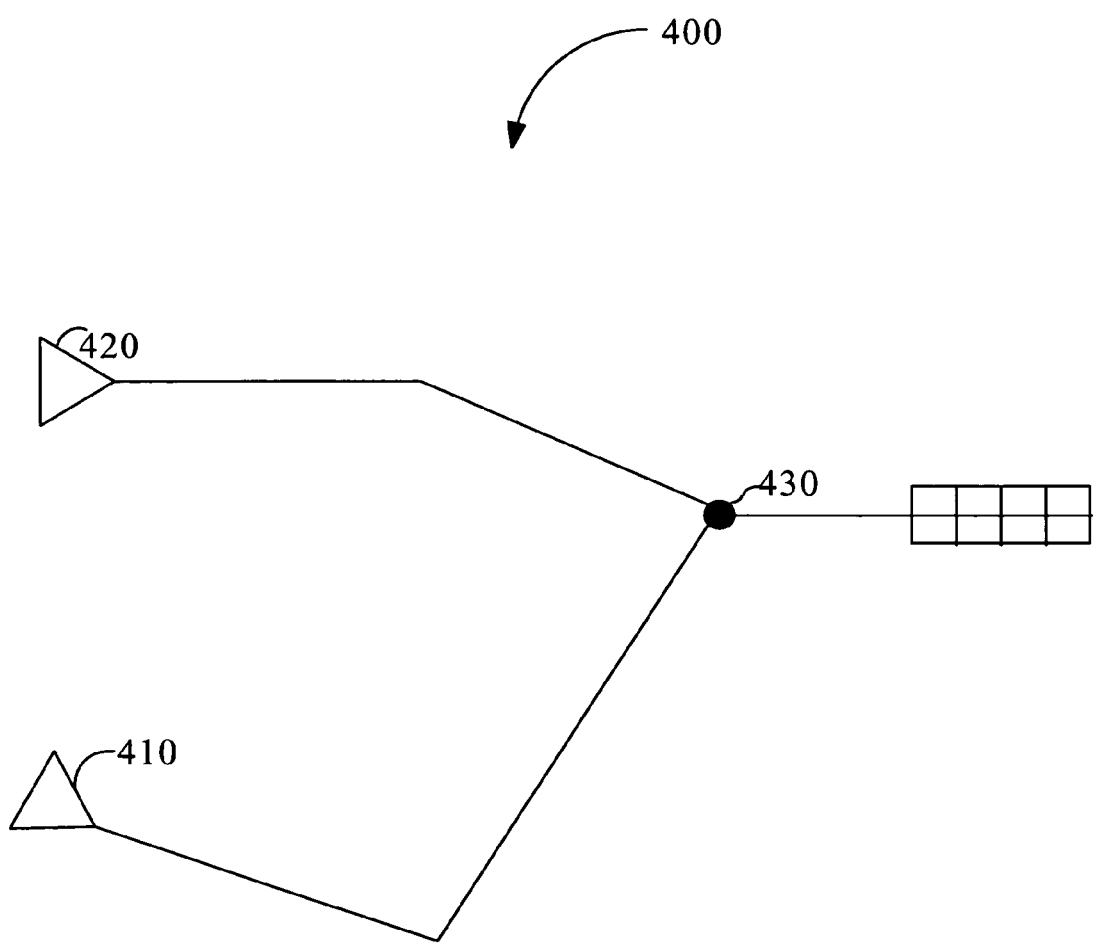
FIG. 4 depicts an exemplary sequence stream in accordance with an embodiment of the invention.

It is contemplated that the merging procedure 200 of FIG. 2 may be employed when it is known that the target aircraft will maintain a constant speed and heading towards the waypoint 230. With speed information of the target aircraft and the distance between the target aircraft 220 and the waypoint, a predicted time of arrival may be calculated. However, in instances when the target aircraft 220 is not directed towards the waypoint, a predicted time of arrival may be unknown. Without intent information of the target aircraft, efficient sequencing may be limited to spacing adjustments one aircraft per pair, leaving other aircraft to fly a constant trajectory. This may allow for efficient merging of a single aircraft but may not affect an overall efficiency of a sequence stream if the intent information of the next target aircraft, aircraft 210, is not available to other aircraft. Referring to FIG. 4 an exemplary diagram 400 of a sequence stream in accordance with an embodiment of the present invention is shown. Proper spacing may be necessary between aircraft 410 and target aircraft 420. When target aircraft 420 is following a heading which is not directed to the waypoint 430, the time of arrival of the target aircraft at the waypoint 430 may be unknown.

In an embodiment of the invention, target aircraft 420 may be able to transmit a required time of arrival at the waypoint to all other aircraft and ground stations. For example, a universal time data point may be transmitted to all other aircraft 410. A following aircraft 410 may be capable of determining a location for a rejoin turn based upon a current heading and a required time of arrival at waypoint 430 for the target aircraft 420. If the universal time transmission rate is non synchronous, the flight management system of the present invention may monitor for the reception of position and velocity messages to verify the integrity of the digital data links. It is further contemplated that the transmission of a required time of arrival may only be necessary in instances when the predicted required time of arrival (based upon current heading, speed of the target aircraft and distance to the waypoint) is beyond a predetermined error bound.

Figure 5:
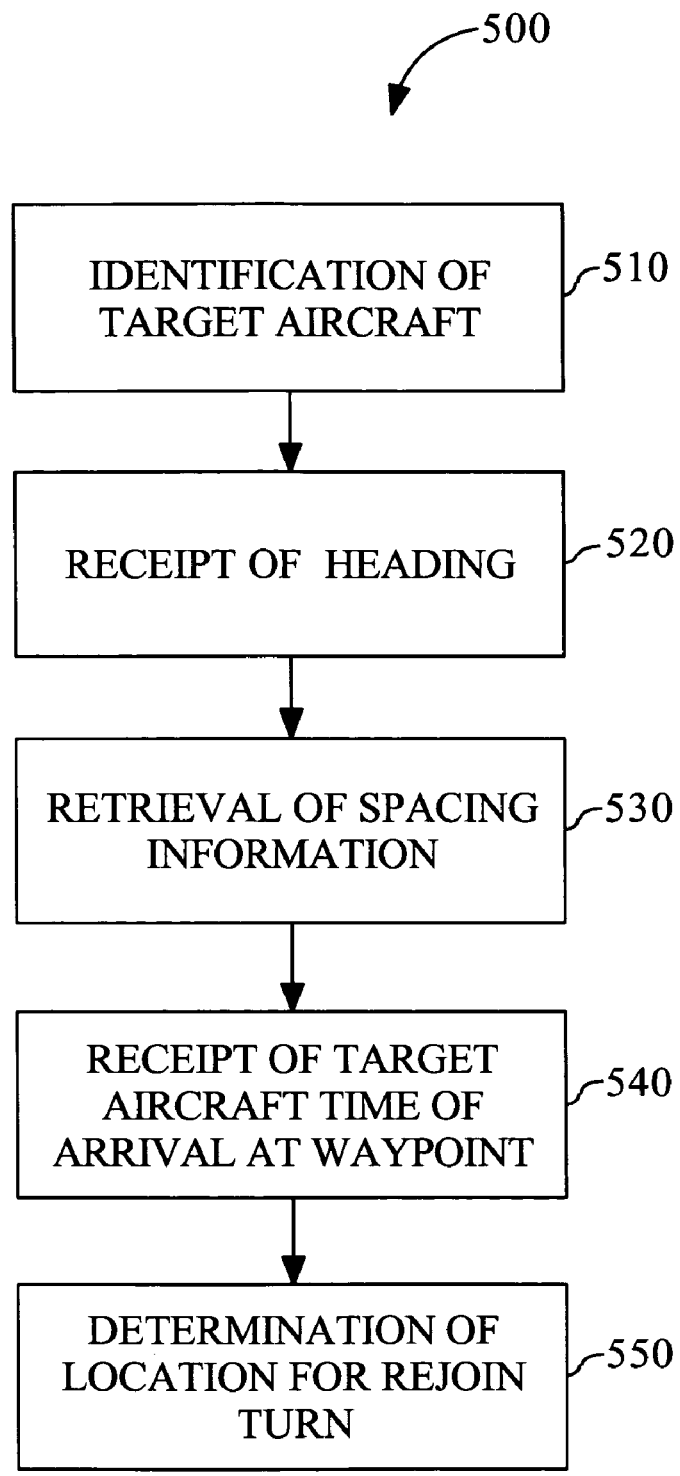
FIG. 5 depicts a process of merging in accordance with an alternative embodiment of the present invention.

Referring to FIG. 5, a process 500 of merging in accordance with an alternative embodiment of the present invention. It is contemplated that process 500 may be executed when a target aircraft's predicted time of arrival may be unknown. Process 500 may begin upon the identification of a target aircraft 510. In order to achieve proper spacing, a heading may be received 520. In one embodiment of the invention, heading may be received from an air traffic controller. The desired spacing information for a particular airport or runway at a particular airport may be retrieved 530. It is contemplated that desired spacing information for an airport or a particular runway of an airport may be maintained in memory of a flight management system of the present invention, such as within a database. It is further contemplated that a desired speed at the waypoint may be maintain in memory of the flight management system to ensure the aircraft is traveling at an appropriate speed. A required time of arrival of the target aircraft at a waypoint may be received. A location to achieve the desired spacing to begin a rejoin turn may be determined 550. The determination of the location may be selected based upon achieving desired spacing after the target aircraft's required time of arrival at the waypoint. The determination of the location may be based upon the current heading and speed of the aircraft and the predicted distance away from the waypoint after the rejoin turn to arrive at the waypoint after the target aircraft according to a desired delay. It is contemplated that the location may be a distance measurement proceeding on the heading, such as 10 nautical miles or alternatively may be a time measurement, such as 30 seconds and the like.

In an alternative embodiment of the present invention, spacing may be created from a designated lead aircraft which may be in the final approach heading. A new target aircraft may be selected as each aircraft lands. Additionally, air traffic controller could assign a required time of arrival for each aircraft at the waypoint whereby each aircraft would receive an initial heading and the flight management system may determine a location of the rejoin turn to create the desired spacing among aircraft.

Figure 6:
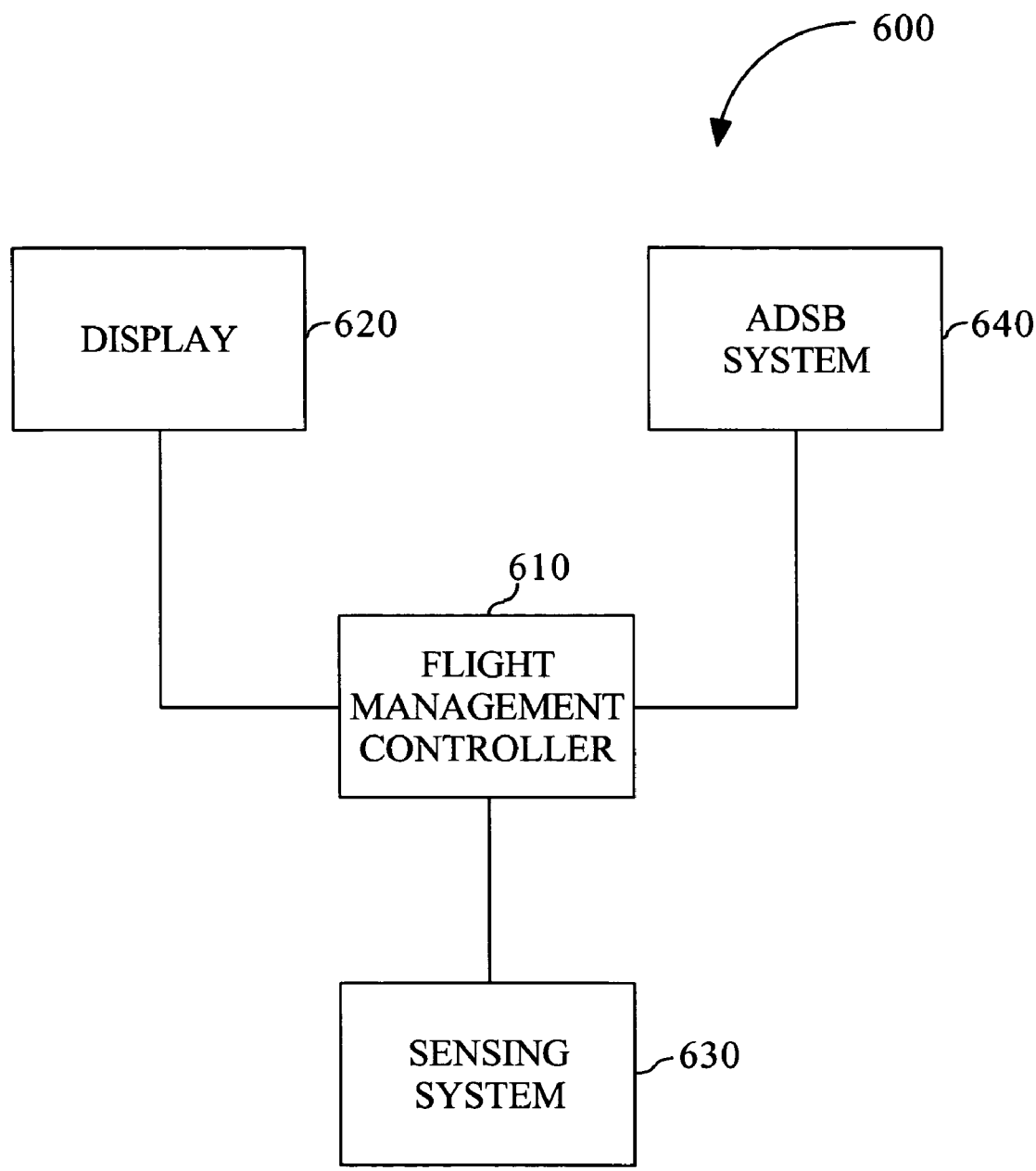
FIG. 6 depicts a block diagram of a flight management system in accordance with an embodiment of the present invention.

Referring to FIG. 6, a block diagram of a flight management system 600 in accordance with the present invention is shown. In one embodiment of the invention, flight management system 600 may be an on-board aircraft flight management system. Flight management system 600 may include a flight management controller 610 which may be coupled to a display 620, sensing system 630 and ADSB system 640. It is contemplated that flight management controller may be capable of executing a program of instructions for implementation of processes 300 of FIG. 3 and 500 of FIG. 5. Display 620 may include a visual display which depicts movement of the aircraft, identification of a target aircraft, display of protected airspace and the like. Sensing system 630 may include a radar system, global navigation satellite system and the like. Sensing system 630 may further include Distance Measuring Equipment (DME), VHF Omnidirectional Radio Range (VOR)/DME, Inertial Reference System (IRS) 245, and dead reckoning data to provide en route, terminal and non-precision approach navigation guidance for each aircraft in a fleet or within a geographically defined area.

Additionally, flight management system may employ an automatic dependent surveillance broadcast (ADSB) system 640. An ADSB system 640 may employ global navigation satellite system technology and a digital data communication link. Position data obtained from the global navigation satellite system along with speed, heading, altitude and heading information may be broadcast to other aircraft, ground and satellite transceivers which are equipped with ADSB system technology. The communication link of the ADSB system may be bi-directional allowing an aircraft and a flight management system 600 of the present invention to receive data from other aircraft and transceivers. For example, the identification of a target aircraft as described previously may be achieved by receipt of information regarding the aircraft through an ADSB link between the aircraft and the target aircraft. ADSB technology may allow a target aircraft to broadcast information such as current heading, speed, distance to a waypoint and the like which a flight management system 600 may utilize to calculate a predicted time of arrival at the waypoint. ADSB system may also be employed to broadcast a universal time data point time of arrival at a waypoint that may be received by flight management system 600. While ADSB system technology may be employed for the broadcast and retrieval of aircraft information, it is contemplated that other types of aircraft broadcast systems may be employed by those with ordinary skill in the art without departing from the scope and intent of the present invention.

Figure 7:
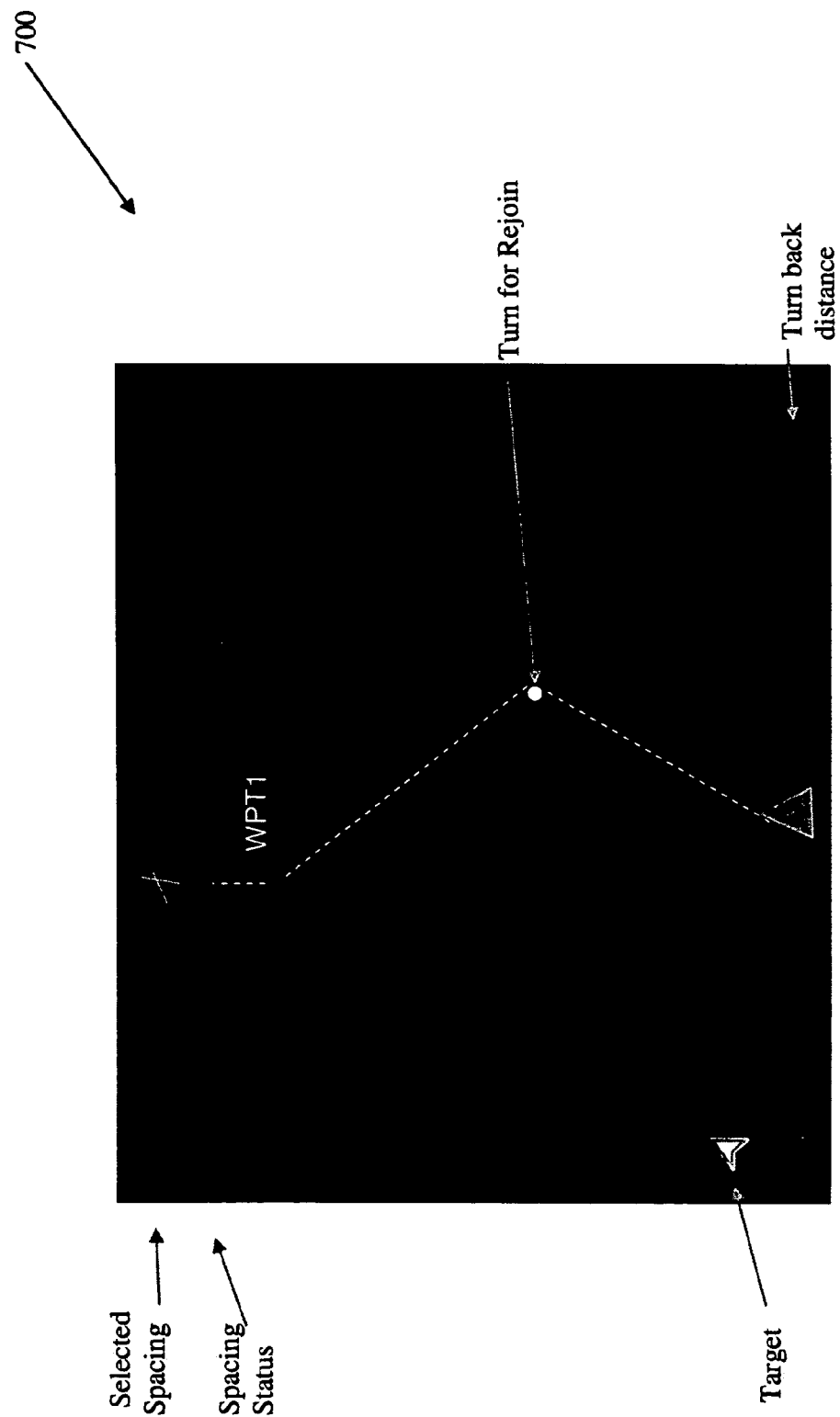
FIG. 7 depicts an exemplary on-board aircraft display for merging in accordance with an embodiment of the present invention.

Referring to FIG. 7, an exemplary on-board aircraft display 700 for merging in accordance with an embodiment of the present invention is shown. Visual display 700 may indicate the presence of the target aircraft, spacing information, actual spacing if the directed path is followed, and a location for the rejoin turn. Advantageously, the pilot and flight crew may be aware of the proper location and upon reaching the determined location for the rejoin turn; the turn may be initiated automatically through an auto-pilot program or manually by a pilot.

Figure 8:
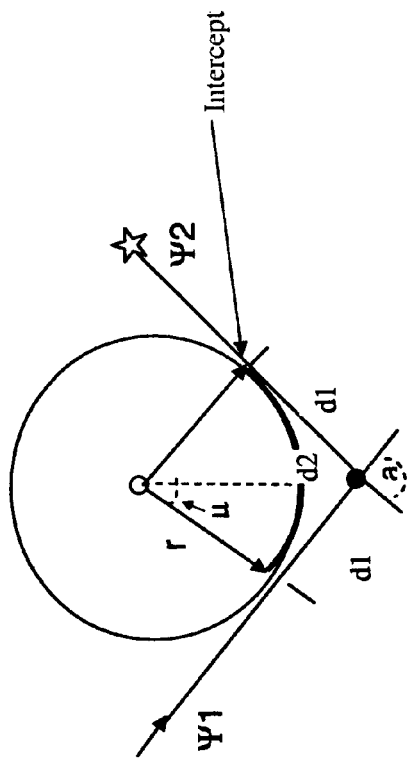
FIG. 8 depicts an exemplary graph for determining a turn location in accordance with an embodiment of the present invention.

Referring now to FIG. 8, an exemplary calculation diagram for determining a location for beginning a rejoin turn to achieve desired spacing between an aircraft and a target aircraft in accordance with an embodiment of the present invention is shown. It is contemplated that aircraft turns are gradual; consequently, a start of turn location, a distance d1, may be calculated as the aircraft may actually travel a distance, d2. Based upon a velocity, v (speed of aircraft), bank angle $\phi$, distance per degree n, and a heading difference $\Delta\psi$, a start of turn location may be calculated. This may allow a more precise determination of a location for a rejoin turn in order to achieve desired spacing between an aircraft and a target aircraft at a waypoint.

While the techniques described have related to two dimensional maneuvers, it is contemplated that three-dimensional maneuvers may also be employed by those with ordinary skill in the art without departing from the scope and spirit of the present invention.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for creating space between an aircraft and a target aircraft; comprising:
   identifying a target aircraft and a time of arrival of said target aircraft at a waypoint, said target aircraft beginning a landing approach after passing said waypoint, said time of arrival at said waypoint being determined from information received from said target aircraft across an automatic dependent surveillance broadcast communication link, said automatic dependent surveillance broadcast communication link including position, speed, heading and altitude information of said target aircraft;
   receiving a heading for said aircraft from air traffic control;
   retrieving spacing information between said target aircraft and said aircraft from at least one of air traffic control or said aircraft, said spacing information referring to a period of time;
   determining a location for a rejoin turn to said waypoint;
   navigating said rejoin turn to said waypoint automatically when said aircraft arrives at said location for said rejoin turn to said waypoint, said aircraft beginning said landing approach after passing said waypoint; and
   displaying said location for said rejoin turn to said waypoint, wherein said location of rejoin turn to said waypoint causing aircraft to reach said waypoint after said target aircraft by a delay of said spacing information, wherein said automatic dependent surveillance broadcast communication link is a direct link between said target aircraft and said aircraft.

2. The method as claimed in claim 1, wherein said time of arrival of said target aircraft is based upon distance between said target aircraft and said waypoint and a speed of said target aircraft.

3. The method as claimed in claim 1, wherein said location is a distance to be traveled by said aircraft proceeding on said heading.

4. The method as claimed in claim 1, wherein said location is a time measurement proceeding on said heading.

5. The method as claimed in claim 1, further comprising verifying a heading change at said waypoint is within a desired range.

6. The method as claimed in claim 1, wherein said location is determined based upon a turn radius of said aircraft.

7. The method as claimed in claim 1, further comprising indicating when said aircraft is proceeding on an unacceptable flight path angle.

8. The method as claimed in claim 1, wherein said location is recalculated as said aircraft proceeds on said heading and is adjusted to compensate for a difference for said time of arrival of said aircraft at said waypoint.

9. A flight management system; comprising:
   means for identifying a target aircraft and a time of arrival of said target aircraft at a waypoint, said target aircraft beginning a landing approach after passing said waypoint, said time of arrival at said waypoint being determined from information received from said target aircraft across an automatic dependent surveillance broadcast communication link, said automatic dependent surveillance broadcast communication link including position, speed, heading and altitude information of said target aircraft;
   means for receiving a heading for said aircraft from air traffic control;
   means for retrieving a spacing information between said target aircraft and said aircraft from at least one of air traffic control or said aircraft, said spacing information referring to a period of time;
   means for determining a location for a rejoin turn to said waypoint;
   means for navigating said rejoin turn to said waypoint automatically when said aircraft arrives at said location for said rejoin turn to said waypoint, said aircraft beginning said landing approach after passing said waypoint; and
   displaying said location for said rejoin turn to said waypoint, wherein said location of rejoin turn to a waypoint causing aircraft to reach said waypoint after said target aircraft by a delay of said spacing information, wherein said automatic dependent surveillance broadcast communication link is a direct link between said target aircraft and said aircraft.

10. The method as claimed in claim 1, wherein said automatic dependent surveillance broadcast communication link including distance information to said waypoint.

11. The flight management system as claimed in claim 9, wherein said automatic dependent surveillance broadcast communication link including distance information to said waypoint.

* * * * *